No. 755,385. PATENTED MAR. 22, 1904.
E. B. PARKHURST.
CASH REGISTER.
APPLICATION FILED JAN. 17, 1898.
NO MODEL. 6 SHEETS—SHEET 3.

WITNESSES:
Wm H. Muzzy
Wm McCarthy

INVENTOR.
Edward B. Parkhurst
BY
Alvan Macauley.
ATTORNEY

No. 755,385. PATENTED MAR. 22, 1904.
E. B. PARKHURST.
CASH REGISTER.
APPLICATION FILED JAN. 17, 1898.
NO MODEL. 6 SHEETS—SHEET 5.

WITNESSES:
Wm. McCarthy
Wm. H. Muzzy

INVENTOR.
Edward B Parkhurst
BY
Alvan Macauley
ATTORNEY.

No. 755,385. PATENTED MAR. 22, 1904.
E. B. PARKHURST.
CASH REGISTER.
APPLICATION FILED JAN. 17, 1898.
NO MODEL. 6 SHEETS—SHEET 6.

WITNESSES:
W<sup>m</sup>. McCarthy
William Muzzy

INVENTOR.
Edward B. Parkhurst
BY Alvan Macauley.
ATTORNEY

No. 755,385.  
Patented March 22, 1904.

UNITED STATES PATENT OFFICE.

EDWARD B. PARKHURST, OF WOBURN, MASSACHUSETTS, ASSIGNOR TO THE NATIONAL CASH REGISTER COMPANY, OF DAYTON, OHIO, A CORPORATION OF OHIO.

CASH-REGISTER.

SPECIFICATION forming part of Letters Patent No. 755,385, dated March 22, 1904.

Application filed January 17, 1898. Serial No. 666,877. (No model.)

*To all whom it may concern:*

Be it known that I, EDWARD B. PARKHURST, a citizen of the United States, residing at Woburn, in the county of Middlesex and State of Massachusetts, have invented certain new and useful Improvements in Cash-Registers, of which I declare the following to be a full, clear, and exact description.

This invention relates to improvements in combined cash-registers, indicators, and check-printers, and has more particular relation to the class of machines operated by pressure upon the keys and a sliding cash-drawer.

One of the several objects of the present invention is to provide an improved mechanism for operating the register, indicator, and check-printing devices through the medium of the operating-keys and the sliding cash-drawer and at the same time making a permanent record of the transactions on a duplicate record-strip.

The invention consists of certain novel constructions, combinations, and arrangements of parts, all of which will be hereinafter more particularly set forth and claimed.

In the accompanying drawings, forming part of this specification.

In the said drawings, 1 represents the frame of the machine, 2 2 the operating-keys, and 5 the sliding cash-drawer. The said frame 1 is of any desired construction and material adapted to contain the several mechanisms and the cash-drawer and form a support for the main journal-shaft 7, which has its respective ends mounted in the side walls of the same. The operating-keys 2 are journaled on said shaft and project through suitable slots formed in the front of the casing 1, so that their forward ends, which are provided with suitably-marked buttons 8, are within convenient reach of the operator. The keys are preferably arranged, as illustrated, in banks representing, respectively, units of cents, tens of cents, units of dollars, and tens of dollars. Each of the said keys is formed with two arms 9 and 10, respectively, the former being adapted to operate the registering mechanism, while the latter actuates the indicator corresponding to the key operated. I will first describe the operation of the registering mechanism in connection with the keys. Each of the said arms 9 is provided at its upper end with a rack-bar 11, pivotally connected thereto, so as to normally lie approximately in a horizontal position upon a supporting-plate 12, mounted upon the frame of the machine. The rack of each bank corresponding to the key of the lowest denomination has one tooth, while the next higher is formed with two teeth, and so on through the entire bank. Immediately over the racks of each bank is a sleeve 13, journaled on a transverse shaft 14 and formed on its periphery with a plurality of spaced pinions 15, each of which is provided with ten teeth, said pinions being located one over each individual rack. The said sleeves represent, respectively, the units-of-cents keys, the tens-of-cents keys, the units-of-dollars keys, and the tens-of-dollars keys and will be so designated and referred to in this specification. Each of these sleeves is provided at one end with a registering wheel or disk 16, having suitable indicating characters upon its periphery corresponding to the characters upon the keybuttons. Each of said sleeves, excepting the units-of-cents sleeve, is further provided with a ratchet-wheel 17, by means of which the transfer from one sleeve to the other is effected, as hereinafter more particularly described. When any one of the keys is depressed, its corresponding rack-bar is drawn forward on the supporting-plate 12, thus causing the incline side of a projection or flange 18, mounted on said bar, to strike against and ride up the incline end 19 of one of a series of guiding-pawls 20, pivotally mounted upon the frame. The continued movement of said bar causes said incline side to engage and ride up the incline face of one of a series of lugs or projections 21, mounted upon guide-bars 22, secured to the plate 12, and thus throw the teeth of the rack into mesh with its respective pinion to operate the latter and the sleeve upon which it is formed to an extent equal to the number of teeth on said rack. Each rack-bar is further provided with an incline flange 23, located in front of its first tooth and adapted to guide said tooth into the proper mesh with its pinion upon the movement of said bar. It will be observed by reference to the drawings that the length of each of the projections 18 is relative to the number of teeth on its respective rack, whereby the rack is held in mesh with its pinion until all of its teeth have passed by said pinion and then permitted to drop back upon the plate 12. When the rack reaches its forward position, the projection 18 passes off of the forward end of the projection 21, so that when the rack is moved in an opposite direction said projection 18 passes under said projection 21, and thus permits a rearward movement without operating the pinion or sleeve. During the forward movement of the rack the respective sleeve 13, with its register-wheel 16 and ratchet-wheel 17, is turned as many tenths of one revolution as there are teeth in the rack and held in such position by one of a series of spring-pressed pawls 24, pivoted upon the frame and engaging the ratchet-wheel. At the end of the first-half of the key-stroke one of a series of noses 25, formed on segmental extensions 26 of the arms 9, strikes the lower end of the respective pawl 20, and thus operates the same to lower its upper end below the surface of the plate 12 and allow the rack-bar to pass rearward without being raised. Upon the return stroke the pawl is returned to its original position by a shoulder 27, mounted on the extension 26. In order to hold each pawl 20 in its adjusted positions, I provide the same with a stop-nose 28, which is adapted to engage any one of a plurality of notches formed in one of a series of pivoted spring-pressed stops 29, mounted upon the frame. The return strokes of the respective keys are accomplished by means of coil-springs 30, connecting them to any suitable portion of the main frame.

Figure 1:
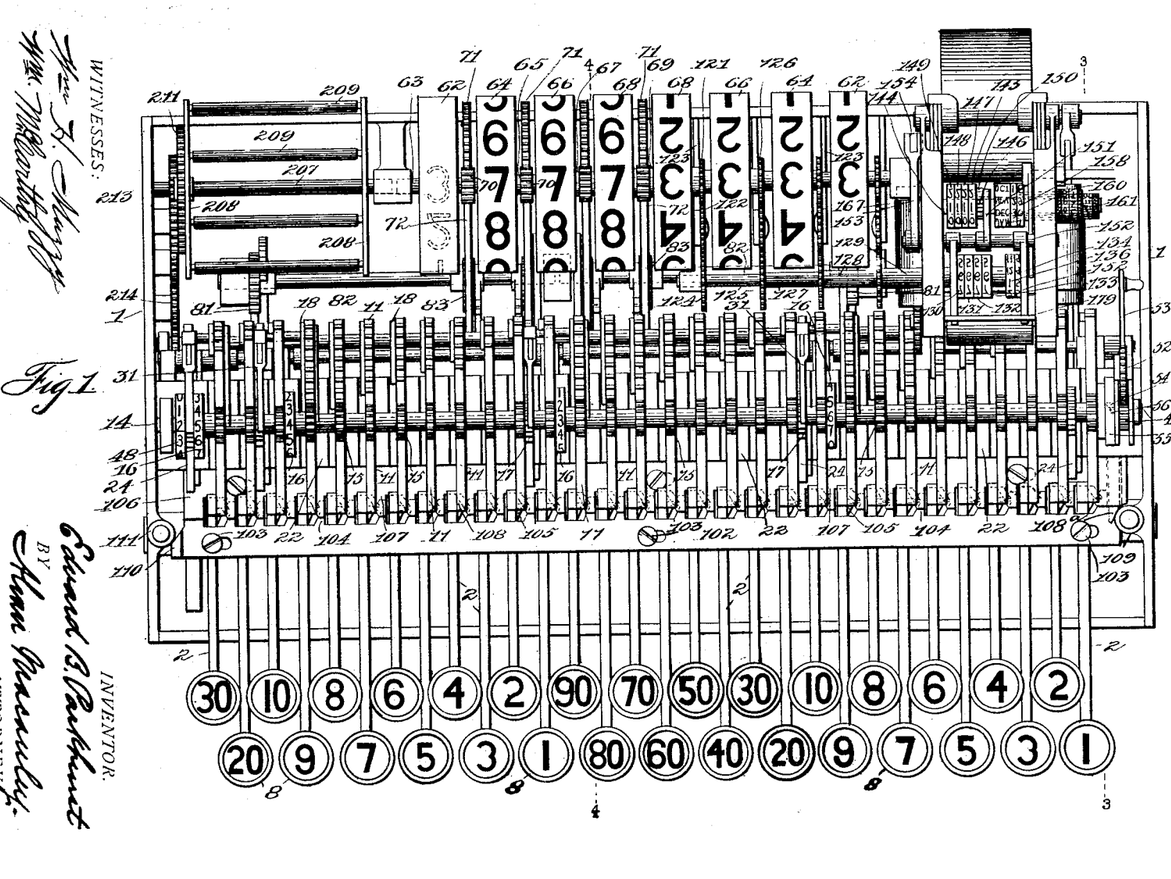
Figure 1 represents a top plan view of the devices embodying my invention.
Figure 2:
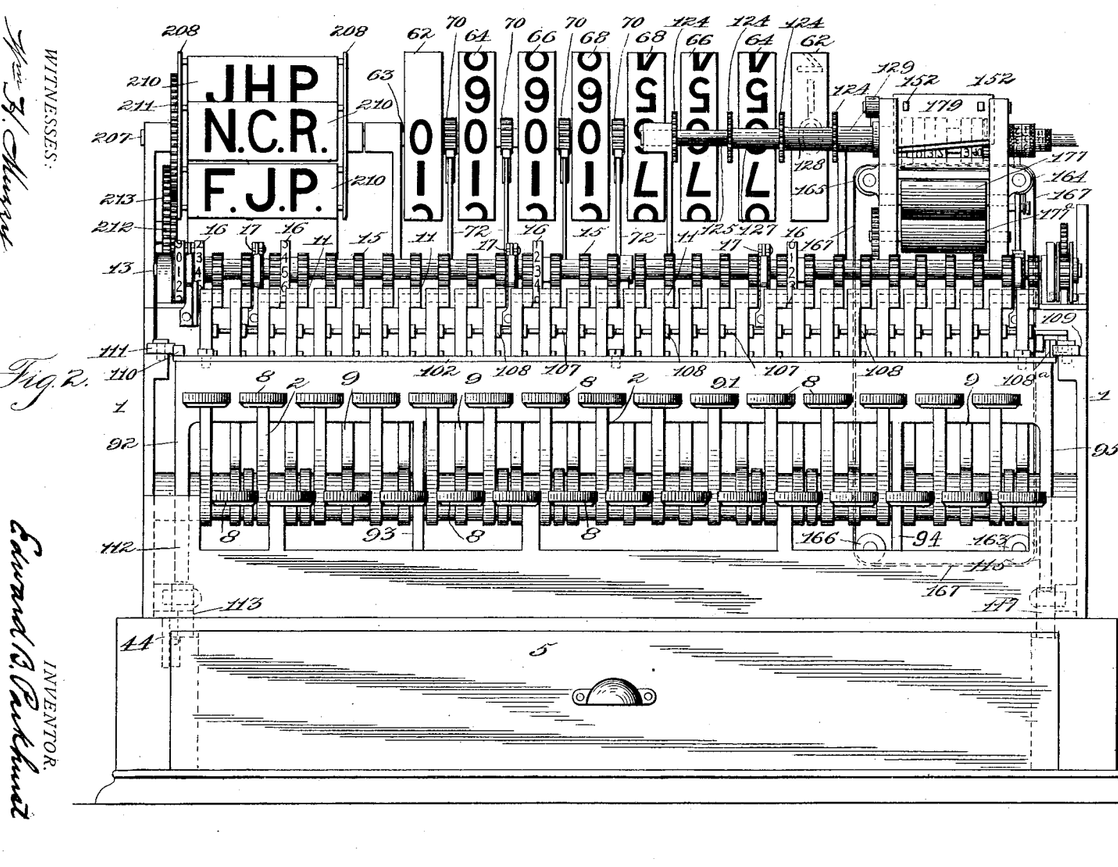
Fig. 2 represents a front elevation of the same.
Figures 3, 7:
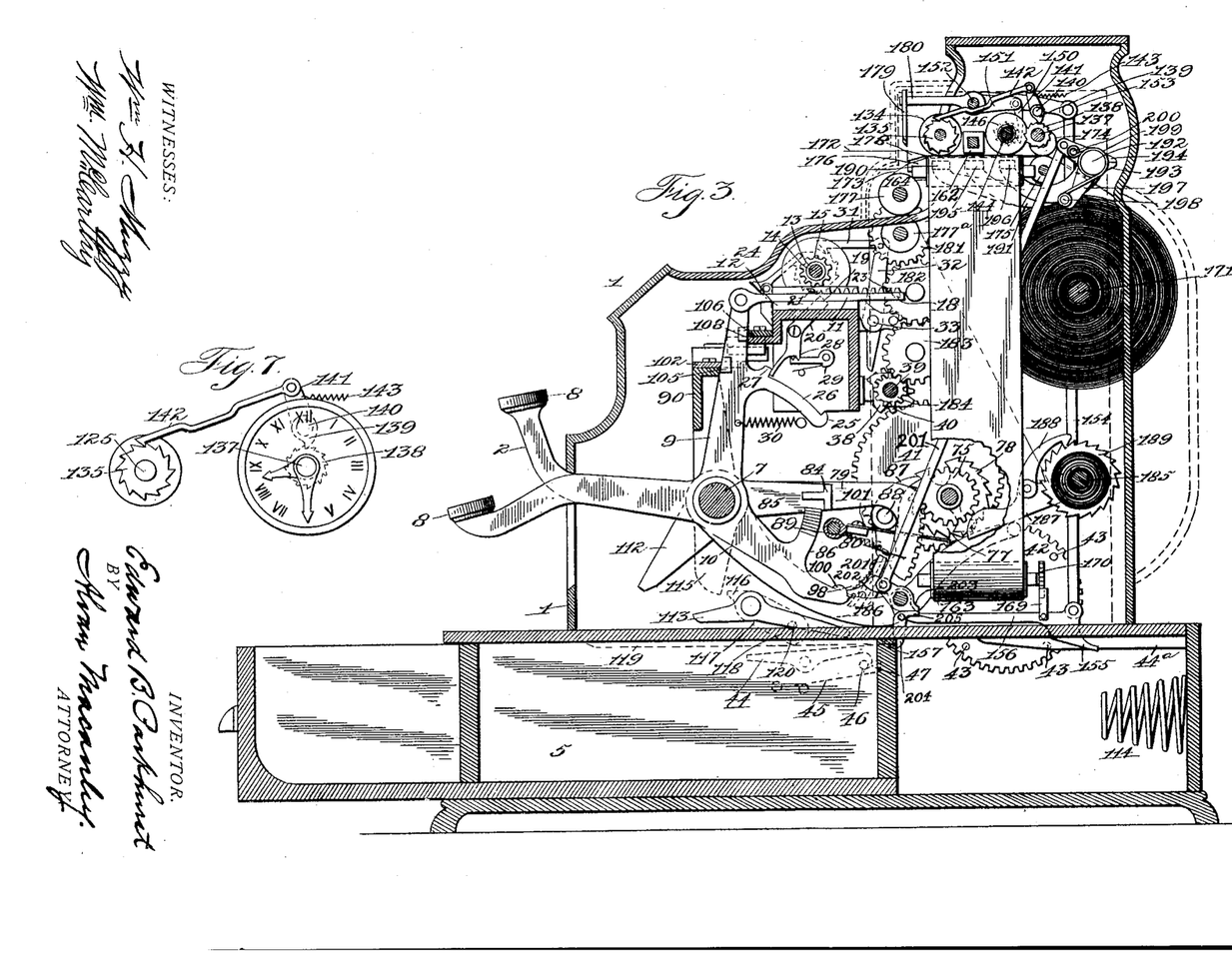
Fig. 3 represents a vertical transverse section through said devices on the line 3 3 of Fig. 1.
Fig. 7 represents an enlarged detail side elevation of a portion of the clock mechanism.
Figures 4, 5, 6:
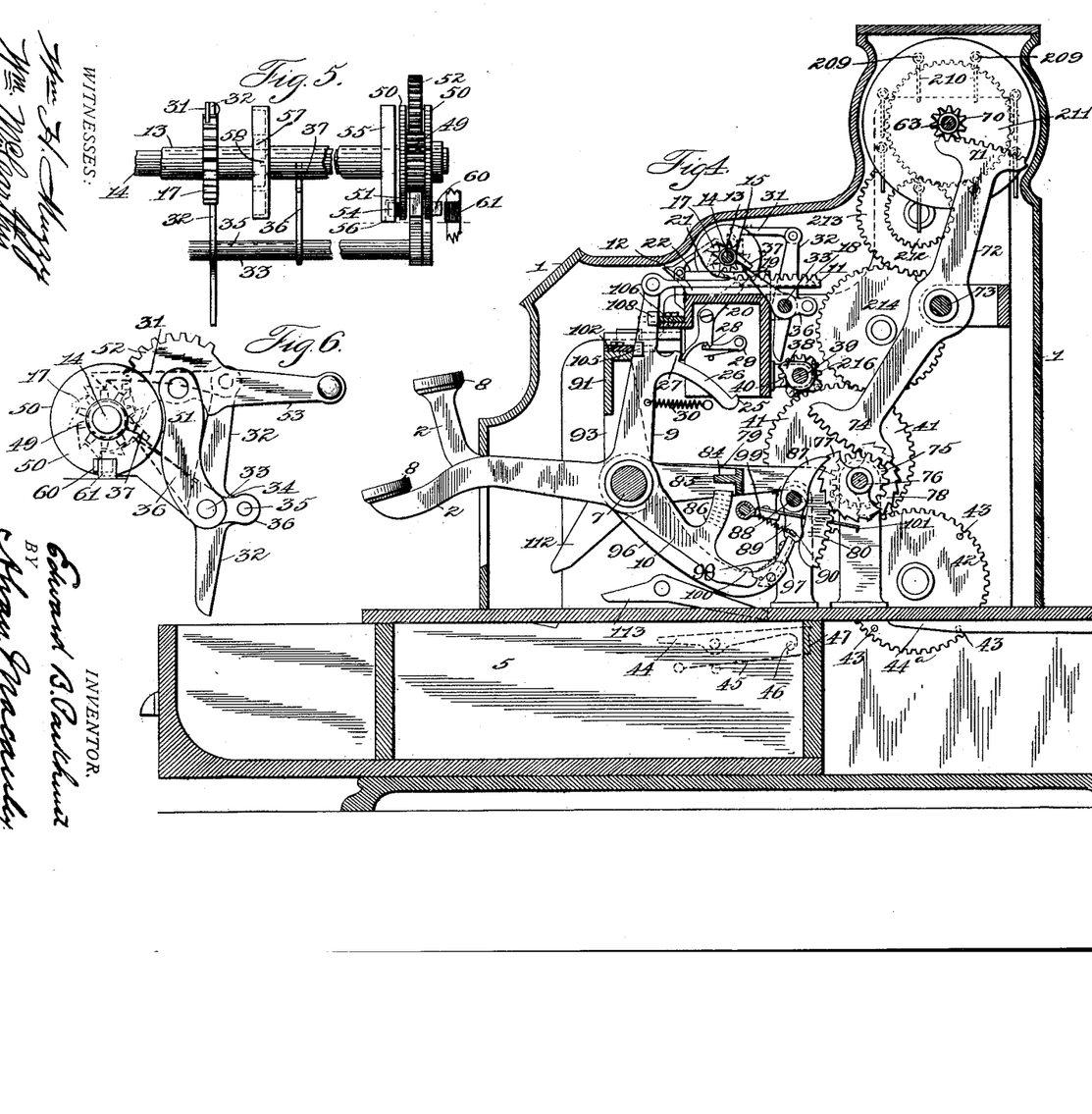
Fig. 4 represents a similar section on the line 4 4 of Fig. 1.
Fig. 5 represents an enlarged detail front elevation of a portion of the mechanism for turning the registering-wheels to zero.
Fig. 6 represents a side elevation of the same.
Figure 8:
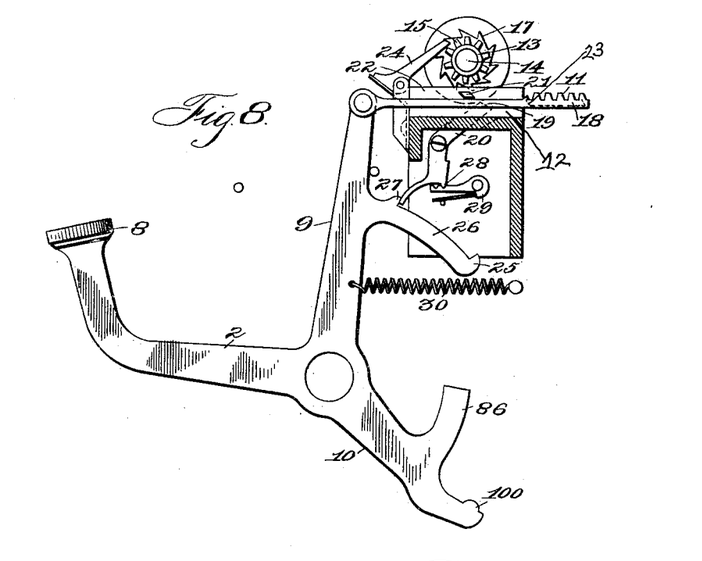
Fig. 8 represents an enlarged detail side elevation, partly in section, of one of the keys and its register-operating mechanism.
Figure 9:
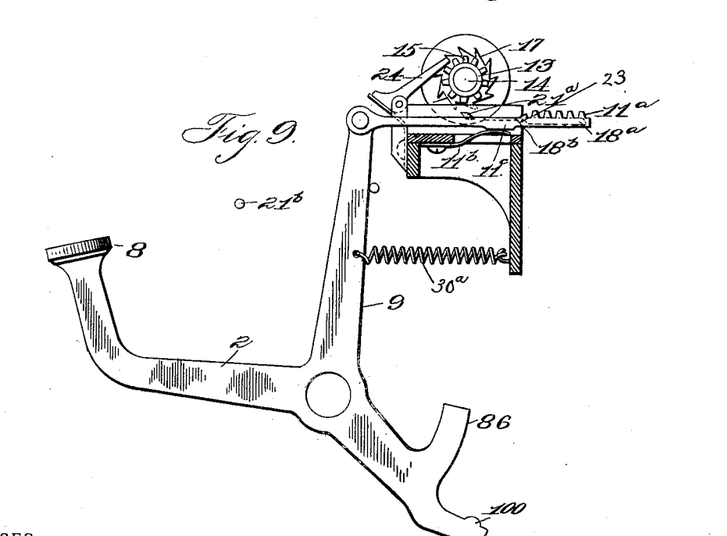
Fig. 9 represents a similar view of a modified form of register-operating mechanism.
Figure 10:
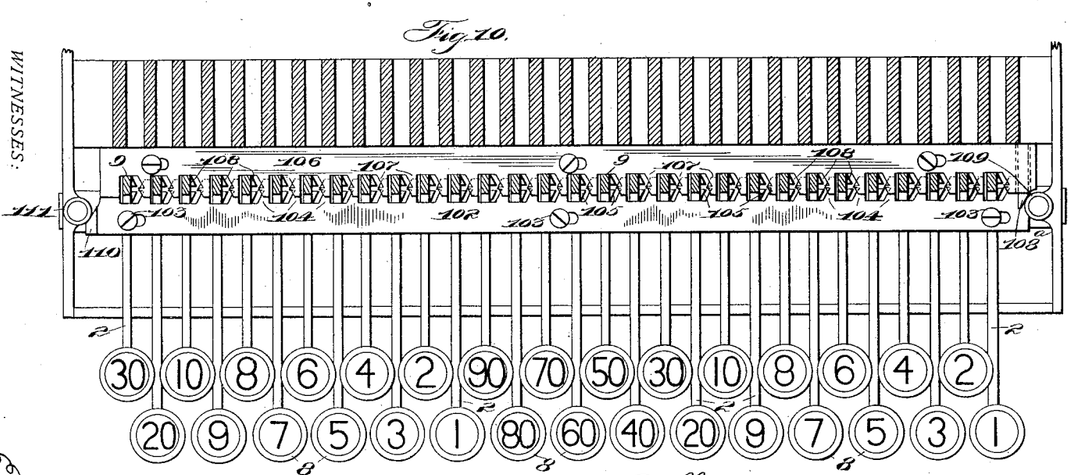
Fig. 10 represents a detail horizontal section taken just above the upper key-locking slide.
Figure 11:
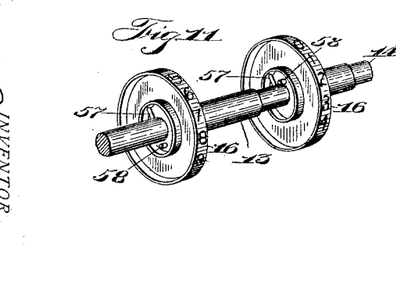
Fig. 11 represents an enlarged detail perspective view of the counter-wheel shaft and counter-wheels with projections for turning the wheels to zero.

In the modified form of my invention (illustrated in Fig. 9) I have provided each of the key-arms 9 with a pivoted rack-bar 11$^a$, which occupies the same relative position in regard to the registering-wheels as the bars 11. Each of these bars normally rests upon the free end of one of a series of bow-springs 11$^b$ and is formed on its under side with an enlargement 11$^c$, which is adapted to contact with said spring to raise said bar. Each of the bars is further provided with a lateral flange or extension 18$^a$, similar to the flange 18, with the exception that it is provided with an extension 18$^b$ of less width and adapted to hold the bar elevated, but not to a sufficient degree to cause its teeth to engage its respective pinion. The arm 9 of each of the keys of this modified form is connected to a portion of the frame by a coil-spring 30$^a$, whereby the key is returned to its normal position after being operated. When a key is operated in this modified form of my invention, the enlargement 11$^c$ first engages the spring 11$^b$ and raises the bar 18$^a$ sufficiently to cause the forward inclined end of the extension 18$^b$ to engage and ride up the incline end of one of a series of lifting-blocks 21$^a$, mounted upon portions of the frame between the respective bars. As the bar moves forward the flange 18$^a$ rides up over its respective block 21$^a$, so as to bring its rack-teeth into mesh with the teeth of its respective register-pinion. When the bar has reached its extreme forward movement, the flange 18$^a$ drops off of the block 21 and permits the rack-bar to drop, so that the said flange may pass under said block on the rearward movement of said bar. In this form of my invention the keys are limited by any suitable stop, but preferably, as shown, by a transverse rod 21$^b$, mounted in front of them.

Figure 13:
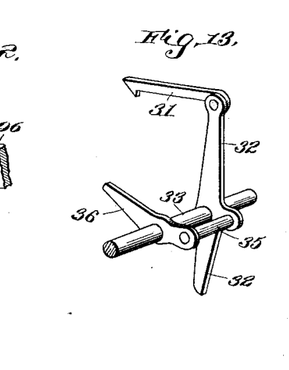
Fig. 13 represents an enlarged detail perspective view of one of the transfer-pawls and its connections.

The above description refers to the straight operation of the register-sleeves by their respective banks of keys. I will now pass on to operation of said sleeves in transferring one to the other and in this connection will state that each of said sleeves, barring the units-of-cents sleeve, which receives no transfer, is provided with an operating gravity-pawl 31, which engages its ratchet-wheel 17 to turn the same one tooth at a time. Each of said pawls is pivotally mounted upon the upper end of a lever 32, said levers being in turn pivotally mounted upon a transverse shaft 33, secured in the frame, and each formed with a laterally-projecting arm 34. Each of these arms 34 is coupled, by means of a rod 35, to one of a series of bell-crank levers 36, loosely mounted upon the shaft 33 in such a position as to be struck and operated by one of a series of arms 37, projecting from the respective sleeves 13. (See Fig. 13.) When one sleeve has made one complete revolution, its arm 37 operates its bell-crank lever 36, as above described, and thus thrusts the pawl 31 of the adjoining sleeve forward on the ratchet-wheel of said latter sleeve, so that the reverse movement of said pawl will rotate the last-mentioned sleeve one tooth. This rearward movement of the pawl is caused by the lower end of the lever 32 being struck by one of a series of noses 38, rigidly mounted upon a transverse shaft 39, which is journaled in the frame of the machine and is given one complete revolution upon each closing of the drawer. The movements of said shaft are imparted to it by a pinion 40, fast thereon and meshing with a gear-wheel 41, journaled on the frame and meshing in turn with a similar gear-wheel 42. This latter gear is provided with four laterally-projecting pins 43 43, located equal distances from each other near the periphery of the wheel and adapted to be struck by the end of a pivoted lever 44, mounted on the drawer. This lever is normally held with its inner end in an elevated position by a flat spring 45, mounted upon the drawer, so that the end of said lever will engage and move one of the pins 43 upon the drawer being closed, but will simply be depressed to pass under the pin upon the drawer being opened. As the drawer is closed, the end of lever 44 strikes the incline under side of a guide-bar 44ª, thus depressing said end and disengaging it from the pin 43, with which it has been in contact. Any excessive upward movement of the lever 44 is prevented by a stop-pin 46, mounted on the drawer and adapted to form a stop for an angular arm 47, formed on the lever.

An additional hundreds-of-dollars registering-wheel 48 is mounted upon the extreme left-hand end of the shaft 14 and receives the transfer from the adjoining bank-sleeve in substantially the same manner as the sleeves themselves.

In order to return all of the registering-wheels to zero when so desired, I provide one end of the shaft 14 with a pinion 49, fast thereon and provided in turn with side flanges or disks 50, which latter form a guide or retaining means for one arm of an approximately V-shaped guide-lever 51. This lever is rigidly fixed to the end of the shaft 33, so that one of its arms projects forward between the flanges 50 below the pinion and the remaining arm upward to form a journal-support for a segmental rack 52, provided with an operating-handle 53, by means of which it may be turned to actuate the pinion 49, with which it meshes. By the above-described constructions the two shafts 14 and 33 bear the same relative longitudinal relation to each other at all times, so that when one of the same is given a longitudinal movement the other will follow. The left flange 50 is provided on the outside near its periphery with a projection 54, having an incline face and adapted to work against a disk 55, fast to the frame or bearing-box and formed with a recess 56, into which said projection may pass. When the operating-lever 53 is drawn forward and the pinion 49 and flanges 50 thereby rotated, the shaft 14, together with the shaft 33, is moved to the right by the said projection 54 passing out of the recess 56 and engaging the face of the disk 55. The longitudinal movement of the shaft 14 causes radiating-pins 57, mounted thereon, to move into alinement with pins 58, mounted upon the respective register-wheels 16, and the rotation of said shaft carries all of said pins 58 into positions directly above the shaft with all of the wheels indicating zero. The longitudinal movement of the shaft 33 moves the bell-crank levers 36 out of the paths of the several arms 37, but is not sufficient to disengage the pawls 31 from their respective ratchet-wheels. By this means any chance of a transfer being made after the wheels have been reset to zero and before it properly should occur is altogether avoided. The lever 53 is now reversed and returned to its former position, thereby rotating the shafts 14 and 33 and returning the pins 57 to their first positions. The reverse longitudinal movement of the shaft 14 is caused by a projection 60, mounted on one of the disks 50 and working against the incline face of a trip-block 61, secured on the frame.

It will be seen from the above description that all of the registering-wheels may be instantly returned to zero when so desired by simply operating the lever 53, this operation also simultaneously disengaging the transferring devices, so that no subsequent and irregular transfer will be made.

Figure 12:
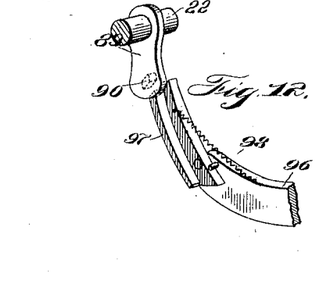
Fig. 12 represents an enlarged detail perspective view of the devices for operating the indicator locking-pawls.

I will now pass on to the operation of the indicating-wheels in connection with the keys. There are two sets or banks of these indicating-wheels, so operated that the right-hand set may be read correctly at the rear of the machine and the left-hand set at the front. Both of the tens-of-dollars indicating-wheels 62 62 are fast upon a transverse shaft 63, mounted in the main frame, while the units-of-dollars indicating-wheels 64 64 are mounted between said wheels 62 upon the opposite ends of a sleeve 65, loose upon the shaft 63. The tens-of-cents indicating-wheels 66 66 are mounted between the wheels 64 upon the opposite ends of a sleeve 67, which is loosely mounted upon the sleeve 65. Lastly, units-of-cents wheels 68 68, which are located between the wheels 66 66, are fast upon the opposite ends of a sleeve 69, which is loosely mounted upon the sleeve 67. It will be seen that by the peculiar construction of sleeve connection between the corresponding wheels of the two groups said corresponding wheels are always caused to move together to an equal extent. The movement of each of said sleeves is effected through the medium of a pinion 70, fast thereon and meshing with one of a series of segmental racks 71, formed upon the upper end of one of a series of operating-levers 72. Each of said levers is pivotally mounted upon a transverse shaft 73 and is formed at its lower end with a segmental rack 74, similar to the rack 71 and meshing with one of a series of pinions 75, loosely mounted upon a shaft 76. To one side of each of the pinions 75 is attached a segmental ratchet 77, while to the opposite side of each of said pinions is affixed a similar segmental ratchet 78, the teeth of which extend in an opposite direction from those of the first-mentioned ratchet, for a purpose hereinafter more fully described. Near the end of each bank of keys is a lever 79, pivotally mounted upon the shaft 7 and formed with a segmental rack 80, which in the case of the two middle banks meshes with its respective gear 75, whereby the latter may be turned to operate the indicator upon said lever 79 being moved. Each of the levers 79 of the two end banks is adapted to operate through the medium of its segmental rack a gear 81, mounted upon a short transverse shaft 82, which in turn is provided with a gear 83, meshing with its respective rack 74. To each lever 79 is attached a bar 84, extending the full length of its respective bank and supported at its opposite end by an arm 85, pivotally mounted upon the shaft 7. Each arm 10 of the respective keys is provided with a lifting-standard 86, which is adapted to contact with the under side of the respective cross-bar 84 when the key is operated, and thus move the respective lever 79. The lifting-standard of the key of the lowest denomination in each bank is the shortest in height, so as to only raise its respective lever 79 sufficient to turn its segmental rack one tooth. The standard of the next higher key in each bank is of sufficient height to turn its respective rack two teeth when raised, and so on through each bank. Each segmental rack is held in the position determined by the stroke of its respective lever 79 by one of a series of pawls 87 87, engaging its segmental ratchet 77 and mounted rigidly upon a transverse shaft 88. The extreme left-hand pawl 87 is formed with an extension or arm 89, on which is mounted a laterally-projecting stud or pin 90, having inclined upper and lower sides. A frame 91 extends the length of the machine in front of the key-arms and is pivotally mounted on the shaft 7 by means of arms 92, 93, 94, and 95, with which it is provided. The said arm 93 is formed with an extension 96, which in turn is provided with a pivoted angular toe or trip 97, a portion of which is in the shape of a wedge. The whole is held forward in position to engage the pin 90 by a coil-spring 98, which is secured to said toe and the extension 96. As the frame 91 is moved forward by the operation of a key the extension 96 is raised, thus bringing the incline side of the wedge portion of the toe 97 into contact with the pin 90 to force the same rearward and simultaneously operate the pawls 87 and release the ratchets 77 and the indicator-wheels held in position thereby. This position of the pawls 87 is maintained during the full downward strokes of the keys; but at the termination of said strokes the pin 90 slips over the lower end of the toe 97, and thus releases said pawls, so that they may be drawn forward by a spring 99 to engage the ratchets 77 and hold the indicating-wheels in the positions to which they have been moved. As the frame 96 descends the lug 90 passes in front of the cam-flange of the toe 97 and presses the toe rearward against the tension of its spring 98, so that when the lug 90 passes free of the cam-flange the toe 97 will spring forward to bring the upper end of the flange into its normal position under the lug 90, as shown in Fig. 12. At the end of the upward movement of each key-arm 10 a nose 100, formed thereon, strikes one of a series of pivoted spring-pawls 101, thus raising the same to engagement with the teeth of its respective segmental rack 78 to lock the latter and prevent any overthrow of the ratchets 77 and indicating-wheels.

The above description pertains exclusively to the mechanisms for registering and indicating, and I will now pass on to the devices for coupling or locking the keys together when being operated. A plate 102 is movably mounted upon the upper side of the frame 91 by means of screws 103, which pass through suitable slots formed in said plate, so as to hold it down in position upon the frame 91, but not interfere with its free longitudinal movement. This plate is formed with a plurality of spaced rearwardly-projecting fingers 104, which extend between the arms 9 of the keys and are provided with hook ends or heads which are adapted to catch over the rear ends of projecting lugs 105, mounted on the sides of the respective arms 9, upon a longitudinal movement of the plate. A plate 106, similar to the plate 102 except that it is mounted upon a portion of the stationary support 12, is so located that its headed fingers 107 project forward between the arms 9, so as to catch in front of lateral projections 108, formed on the sides of said arms, when the plate is moved longitudinally. In pressing a number of keys the arms 9 of the same carry the frame 91 forward, so that the inclined end of a guide-bar 108ª, secured to the plate 102 and working between flanges on the under side of plate 106, will strike an anti-friction-roller 109, mounted upon the frame in its path, and thus move both of said plates to the left and lock the respective arms either against the frame 91 or against the plate 106, according to their positions at the time. (See Figs. 1, 2, 3, 4, and 10.) Upon the upward movement of the frame 91 the plates 102 and 106 are returned to their former positions by a projection 110 on said plate 102 engaging an antifriction-roller 111, mounted on the main frame. It will be observed from the above description that all of the keys are immediately released upon the frame 91 assuming its normal position, and thus left free to be operated again.

In order to provide for the opening of the cash-drawer 5, I provide the arm 92 with a downward extension 112, (see Figs. 2 and 4,) which is adapted to be moved forward upon the operation of the frame 91 to strike and trip a pivoted drawer-latch 113 mounted upon the frame, and thereby release the drawer, which is forced forward by a suitable coil-spring 114, mounted behind the same. After the keys have been returned to their normal positions it is desirable to lock the same against any movement as long as the cash-drawer is open. To effect this result, the arm 95 is provided with an extension 115, (see Figs. 2 and 3,) which is adapted to engage the nose 116 of a pivoted stop 117 when the drawer is in an open position. The rear weighted end 118 of this stop is adapted to project into a groove 119, formed in the top of the drawer, when the latter is open, and thus cause said nose to project into the path of the extension 115, said stop being limited in its downward movement by a laterally-projecting pin 120, with which it is provided, striking a portion of the frame of the machine. When the drawer is closed, the weighted end of the stop is forced upward by the end wall of the groove and the nose 116 thus moved out of the path of the extension 115.

Having thus described the registering, indicating, and locking mechanisms, I will now pass on to the check-printing mechanism.

The sleeve 69, carrying the units-of-cents indicators, is provided with a gear-wheel 121, which meshes with an intermediate gear-wheel 122, mounted upon a bracket 123, secured to the main frame so that it may in turn mesh with a gear-wheel 124, fast upon a short shaft 125, which latter is suitably journaled upon the main frame. The sleeve 67 is provided with a gear-wheel 126, similar to the gear-wheel 121 and adapted to communicate its motion in a similar manner to a sleeve 127, loosely mounted upon the shaft 125. The remaining sleeve 65, as well as the shaft 63, is similarly connected to sleeves 128 and 129, loosely mounted over each other and over the sleeve 127. Each of the said sleeves 127, 128, and 129, as well as the shaft 125, is provided at one end with printing-wheels 130, 131, 132, and 133, respectively, which correspond to the denominations of the indicators to which the said sleeves are connected. Loose on the right end of the shaft 125 is a five-minute-printing time-wheel 134, provided with a ratchet-wheel 135, and also an hour time-printing wheel 136. These time-wheels are operated by a short shaft or spindle 137, journaled in the frame and connected to an ordinary clock mechanism, (not shown,) whereby it is turned one complete revolution every hour. A twelve-tooth ratchet-wheel 138 is fixed to the spindle 137 and is engaged by a pawl 139, mounted upon a spindle 140, which latter also carries an arm 141, having an operating-bar 142 pivoted to its outer end. This bar is formed at its forward end with a hook or head, which engages the teeth of the ratchet-wheel 135 to rotate the latter. During each twelfth of each revolution of the wheel 138 pawl 139 is carried rearward, thus giving a forward movement of the bar 142 and causing its head to catch over the next tooth of the wheel 135. When the end of the pawl 139 slips off of the tooth engaging the same, the bar 142 is drawn back to rotate the wheel 135 one tooth by a spring 143, secured to the arm 141 and a portion of the frame. At the end of each revolution of the five-minute wheel the hour-wheel is turned one-twelfth of one revolution, so as to bring the proper hour-type into printing position by a suitable transferring device. (Not illustrated.)

Loose upon a transverse shaft 144 is a units-printing wheel 145, which is provided with a ten-toothed ratchet-wheel 146 and tens-printing wheel 147, hundreds-printing wheel 148, and thousands-printing wheel 149. (See Fig. 1.) This ratchet-wheel 146 is engaged by a pendent pivoted pawl 150, (see Fig. 3,) which is mounted upon an arm 151, rigidly secured to a transverse rock-shaft 152. The said rock-shaft further carries a rearwardly-projecting arm 153, pivotally connected at its free end to a vertical link-rod 154, which is in turn pivotally connected to a trip-foot 155, formed on a pivoted lever 156. Upon the closing of the cash-drawer a fixed transverse rod 157 at the rear of the same contacts with and raises the foot 155, thus rocking the shaft 152 and operating the pawl 146 to rotate the units numbering-wheel one tooth of its ratchet. At the end of each revolution of any of the first three mentioned printing-wheels the wheel of the next higher denomination is turned one-tenth of one revolution by any ordinary form of transfer mechanism. It will be seen from the above that all of the checks issued by the machine bear a consecutive number. The said spindle 144 further forms a support or journal for the sleeve of a units-date printing-wheel 158 and also for the sleeves of a tens-date printing-wheel 160 and a month printing-wheel 161, said sleeves extending to the exterior of the machine and being provided with any usual form of index-wheels whereby they may be turned to the desired positions. Between the printing-wheels on shaft 125 and spindle 144 is located an advertisement-printing plate 162, which is adapted to print upon the check simultaneously with the printing-wheels.

Four rollers 163, 164, 165, and 166, respectively, are suitably journaled on the frame of the machine and form supports for two endless inked ribbons 167, which lie one over the other and pass under and in proximity to the printing-types. Upon each closure of the drawer and raising of the foot 155 the ribbons are moved forward slightly by means of a spring-pawl 169, mounted on the lever 156 and engaging a ratchet-wheel 170, mounted on the shaft of one of the ribbon-supporting rollers. The paper-strip roller 171 is suitably journaled on the frame and is wound with two webs or strips 172 and 173 of check-paper, the upper strip being for the issued checks and the lower for the permanent record of the transactions, which is to remain in the machine. These webs or strips pass upward between guiding-rollers 174 and 175, under the printing-types, and over a guide-bar 176, where they separate, the lower strip passing downward between friction feed-rollers 177 and 177$^a$ and the upper one out of the machine over a knife-plate 178, where it is severed by a knife 179, carried by two arms 180, fast to shaft 152, so as to oscillate therewith. The duplicate inked ribbons pass, respectively, over the top paper strip and between said strips, so that a visible impression of the types will be left upon both of said strips. The said lower feed-roller 177$^a$ is provided with a gear-wheel 181, which meshes with intermediate gear-wheels 182 and 183, mounted upon the frame, and one of the same meshing in turn with a pinion 184, mounted on the shaft 39. By this means the closing of the drawer will rotate the roller 177$^a$ a circumferential distance equal to the length of one check, and thus move both of the paper strips forward to an equal degree. The lower web 173 of paper after passing between the rollers 177 and 177$^a$ passes downward to a rotatable receiving-roller 185, upon which it is wound. At each operation of the keys an arm 186, which is an extension of arm 94 of the frame 91, raises the forward weighted end of a lever 187, journaled upon the frame, thereby causing a pawl 188, with which said lever is provided, to ride up over the teeth of a ratchet-wheel 189, mounted upon the roller 185. By means of this weighted lever 187 and its connection to the roller 185 the lower web of paper is wound upon the said roller and kept normally taut or under tension. Beneath the printing-wheels mounted upon the shaft 125 and under the aforementioned strips and ribbons is located a platen 190, mounted on the forward ends of two spaced arms or levers 191, which are loosely journaled upon a transverse rotatable shaft 192, said arms having noses 193, which normally abut with similar noses 194, fixed to said shaft. Similar platens 195 and 196 are mounted under the advertising-plate and the remainder of the printing-wheels and are constructed and operated in substantially the same manner as said first-mentioned block. A bell-crank lever 197 is rigidly mounted upon the shaft 192, with one of its arms serving as a stop against a pin 198, mounted upon the frame. The hub of said crank forms a support for a coil-spring 199, one end of which is fixed to a pin 200 on said bell-crank and the opposite end to the stop-pin 198. To the end of the bell-crank is pivotally connected the upper end of an operating-rod 201, which is connected at its lower end to an arm 202, journaled upon the frame and formed with a stop-nose 203. A pivoted trip 204 is mounted upon an extension of the arm 202 and is also formed with a stop-nose 205, which is adapted to abut against the nose 203 when the lower end of the trip is forced forward. The location of said trip is such that its lower end projects into the path of the bar 157, so that when the drawer is closed said bar will strike said trip and operate the bell-crank to put the spring 199 under tension and at the same time allow the platens to descend because of the upward movement of the noses 194. When the trip slips off of the bar 157, the spring 199 returns the shaft 192 rapidly to its former position. This rapid movement is abruptly brought to a stop by the pin 198; but the respective platens continue their movements because of impetus imparted to them, and thus carry the webs and ribbons upward against the several types. After each stroke of said platens the same again drop to their normal positions, with the noses 193 resting against the noses 194. On the forward movement of the drawer the arm 202 is not operated, as the bar 157 in striking the trip 204 simply oscillates the same upon its pivot, as the direction of movement separates the noses 203 and 205 instead of bringing them together. By the above-mentioned tapping stroke the check, which is to be thrown out to represent the last operation of the machine, receives its impressions of amount and time only, the impressions of advertisement, number, and date having been made upon it at the preceding operation of the machine. In closing the drawer portions of two checks are printed, the first receiving its final impression and the second its first impression. Near the end of the movement of the drawer the knife 179 is operated and caused to descend to sever the check, which is protruding beyond the edge of the cutting-bar 178.

An advertising drum or reel is mounted upon a short shaft 207 near one end of the machine and comprises two ends or disks 208, connected at intervals near their peripheries by a plurality of pivoted rods 209, provided, respectively, with pendent tablets 210, upon which any desired advertising or other matter may be mounted. One of the said disks 208 is provided with a gear-wheel 211, which receives motion from the drawer through intermediate gears 212, 213, 214, 141, and 142, whereby said drum is turned through a portion of its revolution during each operation of the machine and a new advertising-tablet thus brought into view, both at the front and the rear of the machine.

Having thus described my invention, what I claim as new, and desire to secure by Letters Patent, is—

1. In a cash-register, the combination with a plurality of keys, of a registering mechanism, devices connected to each key for operating said mechanism and a pivoted lever for each of said devices adapted to be operated by the keys to throw said devices into mesh with the registering mechanism and devices mounted on said keys for engaging and moving said levers.

2. In a cash-register, the combination with a plurality of keys, of a registering mechanism, movable rack-bars mounted on said keys, pivoted levers for raising said rack-bars into engagement with the registering mechanism and means for operating said levers by the keys and independently of the racks.

3. In a cash-register, the combination with a plurality of keys, of operating-arms on said keys operating-racks mounted on said arms graduated arms also formed on said keys, a register arranged to be operated by said racks, an indicator, and indicator-operating devices adapted to be positively operated by the graduated arms of said keys.

4. In a cash-register, the combination with a plurality of keys, of a movable frame adapted to be operated by the same, laterally-movable devices mounted on the frame for locking the keys to said frame, means for positively operating said devices by the movement of the frame, and relatively stationary devices for locking the unoperated keys, also arranged to be operated upon the movement of the frame.

5. In a cash-register, the combination with a plurality of keys having locking-lugs, of a movable frame, an independently-movable plate mounted on said frame and having hook-locking fingers extending between the respective keys, means for positively actuating said movable plate upon the movement of the frame to cause said hook-fingers to hook over the lugs of the operated keys and thus hold them against the frame.

6. In a cash-register, the combination with a plurality of keys, of a movable frame, a longitudinally-slidable key-locking plate mounted on said frame, a slidable key-locking plate mounted on the main frame, devices connecting said plates whereby they are caused to slide together in one direction and means mounted on the main frame for moving one of said plates upon the operation of the movable frame.

7. The improved mechanism for registering devices comprising a registering device, a toothed wheel to operate the same, a pawl to prevent retrograde movement of the said parts, actuating devices for said toothed wheel, stationary means to hold said devices in engagement with said toothed wheel as they are moved in one direction, and holding them from engagement therewith during their movements in the opposite direction, and a positively-actuated switching device acting upon the said devices at or adjacent to the starting end of the movement of the latter and serving to place the same in position to engage said toothed wheel in its next advancing movement.

8. In a cash-register, the combination with a registering-wheel, actuating means for said wheel, a stationary device for holding the actuating means in engagement with said toothed wheel as said means is moved in one direction and holding it from engagement therewith during its movement in the opposite direction, and a positively-actuated switching device arranged to be engaged by the actuating means whereby the latter is elevated to engage the stationary device at the proper time.

9. In a cash-register, the combination with a check-printing mechanism, of a movable arm carrying a platen, and means mounted independently of said arm for moving it and arranged to be suddenly arrested to allow the arm to continue its movement and strike a quick rebounding blow.

10. In a cash-register, the combination with a plurality of keys formed with standards of graduated lengths, of a rock-frame fulcrumed concentric with the keys and arranged to be moved different distances by said standards as the latter are raised upon the operation of the keys, a pinion operated by said rock-frame, an indicator carrying a pinion, and a pivoted lever carrying racks which engage the respective pinions.

11. In a cash-register, the combination with a plurality of keys, of a registering mechanism, racks mounted on said keys for operating said mechanism, stationary projections on said racks arranged to force said racks into engagement with the registering mechanism and pivoted levers for independently lifting said racks to engagement with the registering mechanism.

12. In a cash-register, the combination with a suitable frame, of a series of keys, a registering mechanism, racks mounted on said keys, stationary projections on the frame and rigid projections formed on said racks and arranged to engage the projections of the frame to force the racks into mesh with the registering mechanism and hold them there during registering.

13. In a cash-register, the combination with a series of keys, of a registering mechanism, racks mounted on said keys for operating said mechanism, rigid projections on said racks for holding them to engagement with the registering mechanism, and movable devices mounted independently of the racks for lifting said racks to engagement with said mechanism.

14. In a cash-register, the combination with a suitable frame of a series of keys, a registering mechanism, racks mounted on said keys, lifting projections on said racks, and lifting projections mounted on the frame in such manner that the first-mentioned projections will engage and ride up and over them in one direction and under them in the opposite direction, and means for positively lifting the rack-bars to cause the rack-bar projections to engage the lifting projections.

15. In a cash-register, the combination with a series of keys, of a registering mechanism, racks pivotally mounted on said keys, lifting-flanges on said racks, pivoted levers for independently lifting said racks, latches for temporarily holding said levers in the positions to which they are moved and trip-arms on said keys arranged to engage and move said levers.

16. In a cash-register, the combination with a plurality of keys, of a registering mechanism, a gear-wheel communicating with said mechanism, a cash-drawer, and a projection mounted on said drawer so as to engage and operate the gear-wheel and means for moving said drawer projections out of communication with the gear at a certain predetermined time.

17. In a cash-register, the combination with a series of keys, of a movable frame common to all of the keys and arranged to be moved by the same, a cash-drawer and a pivoted weighted stop-pawl which normally rests upon the top of said drawer and is thus supported out of the path of the movable frame but is allowed to descend by gravity to move into the path of said frame when the drawer is opened.

18. In a cash-register, the combination with a plurality of operating-keys, of a rack adapted to be positively operated by any one of said keys, a visual indicator, a lever connected to said indicator, and means positively meshing with the teeth of said rack for transmitting the movements of the same to said lever.

19. In a cash-register, the combination with a series of keys, of a registering mechanism, a series of racks mounted on said keys, and a stationary device for positively lifting and holding the racks to engagement with the registering mechanism as they are moved in one direction and from engagement therewith when moved in an opposite direction.

20. In a cash-register, the combination with a series of keys, of a registering mechanism, register-operating arms mounted on said keys, graduated arms also mounted on said keys, a movable frame arranged to be operated by said latter arms, an indicator, means connecting the indicator and movable frame and a printing device connected to said indicator so as to be operated to an equal degree therewith.

21. In a cash-register, the combination with a series of keys, of a registering mechanism, register-operating arms mounted on said keys, graduated arms also mounted on said keys, a movable frame arranged to be operated by said latter arms, an indicator, means connecting the indicator and movable frame, a gear on said indicator and a printing device carrying a gear meshing with the aforesaid gear.

22. In a cash-register, the combination with a plurality of keys, of a registering mechanism, an indicator, rack-bars connected to said keys and adapted to operate said mechanism, lifting-flanges mounted on said bars and of different lengths according to the denominations of the keys to which they are connected, and relatively stationary means arranged to be engaged by said flanges and controlled by the keys.

23. In a cash-register, the combination with a plurality of keys, of a registering mechanism, rack-bars mounted on said keys and adapted to engage said mechanism, pivoted levers for raising said rack-bars, a spring-pressed catch for each key for holding its lever in either of its adjusted positions and devices connected to the keys for operating said levers.

24. In a cash-register, the combination with a plurality of keys, of a registering mechanism, rack-bars pivotally mounted on said keys, and formed with lifting-flanges and lifting projections mounted on the frame so as to be struck by the lifting-flanges to force the rack-bars to engagement with the registering mechanism on the forward stroke and away from the same on the back stroke and means for positively lifting the rack-bars to cause the flanges to engage the lifting projections.

25. In a cash-register, the combination with a check-printing mechanism having a plurality of types, of an arm carrying a platen, and an operating-nose, a shaft supporting said arm and provided with an operating-nose adapted to strike the first-mentioned nose, and means for operating said shaft.

26. In a cash-register, the combination with a plurality of keys, of graduated standards mounted on the same, a movable frame adapted to be operated by said standards, an indicator, a pinion adapted to be operated by said frame and communicating with the indicator, reversely-facing ratchet devices connected to said pinion, a pawl normally engaging one of said ratchets, and a pawl adapted to be thrown into engagement with the remaining ratchet upon the operation of the keys.

27. In a cash-register, the combination with a plurality of keys, of a registering mechanism, a train of gearing communicating with said mechanism, a cash-drawer, a pivoted operating-pawl mounted on the drawer and adapted to engage one of said gears and means mounted on the frame for disengaging said pawl from said gear after a predetermined movement.

28. In a cash-register, the combination with a plurality of keys, of a movable frame adapted to be operated thereby, a printing mechanism, a paper-strip-supply roll, a receiving-roller, a weighted pawl arranged to be raised by said frame and adapted to operate said latter roller when released and allowed to descend.

29. In a cash-register, the combination with a plurality of keys, of a slidable key-locking plate, a second slidable key-locking plate, devices connecting said plates whereby they are caused to slide together laterally but one of the same may be moved forward independently and means for moving one of said plates.

30. In a cash-register, the combination with a plurality of keys, of a registering mechanism, movable rack-bars mounted on said keys, and movable devices arranged to be engaged by the keys and thus actuated to force the racks into engagement with the registering mechanism.

31. In a cash-register, the combination with a series of keys, of a registering mechanism, movable rack-bars mounted on said keys and devices arranged to be set by the keys to positions in which they will be engaged by the rack-bars whereby the latter are actuated and moved into engagement with the registering mechanism.

32. In a cash-register, the combination with a plurality of keys, of a registering mechanism, rack-bars mounted on said keys, movable devices for raising said rack-bars into engagement with the registering mechanism and means for operating said movable devices by the keys and independently of the racks.

33. In a cash-register the combination with a plurality of keys, of a registering mechanism, movable racks mounted on said keys and means arranged to be set by the keys so that they will be engaged by the racks to lift the latter.

34. In a cash-register, the combination with a plurality of keys, of a registering mechanism, movable racks mounted on the keys and lifting devices mounted independently of the keys but arranged to be operated by the same and move into the path of said racks whereby the latter are lifted by engagement therewith.

35. In a cash-register, the combination with a plurality of keys, of a frame arranged to be moved by said keys, a movable locking-plate mounted on said frame for locking the operative keys thereto, a movable locking-plate mounted independently of the frame for locking the unoperative keys and means connecting the two plates whereby they are simultaneously operated to lock and unlock the keys.

36. In a cash-register the combination with a printing mechanism, of a movable member carrying a platen and means mounted independently of said member for operating it and arranged to be suddenly arrested in its movement to allow said member to continue its movement alone.

In testimony whereof I affix my signature in the presence of two witnesses.

EDWARD B. PARKHURST.

Witnesses:
JOHN W. JOHNSON,
LOTTIE W. WYMAN.